(12) United States Patent
Chan et al.

(10) Patent No.: US 6,339,696 B1
(45) Date of Patent: Jan. 15, 2002

(54) IN-VEHICLE AUDIO/VIDEO SYSTEM

(75) Inventors: Lawrence K. Y. Chan; Sam C. M. Wong, both of Happy Valley (HK); Mark Jones, Long Beach, CA (US)

(73) Assignee: Magnadyne Corporation

( * ) Notice: Subject to any disclaimer, the term of this patent is extended or adjusted under 35 U.S.C. 154(b) by 0 days.

(21) Appl. No.: 09/435,379

(22) Filed: Nov. 5, 1999

(51) Int. Cl.[7] ............................................... H04B 15/00
(52) U.S. Cl. ........................... 455/62; 455/66; 455/345; 455/568
(58) Field of Search ............................. 455/66, 90, 62, 455/345, 517, 566, 568, 567, 184.1, 41, 182.3, 179.1, 188

(56) References Cited

U.S. PATENT DOCUMENTS

| | | | | |
|---|---|---|---|---|
| 3,931,579 A | * | 1/1976 | Ma | ........................ 455/184.1 |
| 4,021,737 A | * | 5/1977 | Trask | ........................... 455/41 |
| 4,135,158 A | * | 1/1979 | Permet | ........................ 325/317 |
| 4,383,626 A | | 5/1983 | Weinblatt | |
| 4,665,559 A | * | 5/1987 | Benun | ........................ 725/151 |
| 4,866,515 A | | 9/1989 | Tagawa et al. | |
| 4,896,209 A | | 1/1990 | Matsuzaki et al. | |
| 4,905,303 A | | 2/1990 | Johnson, Jr. et al. | |
| 5,023,931 A | * | 6/1991 | Strect | ........................... 455/21 |
| 5,243,415 A | * | 9/1993 | Vance | ........................... 725/81 |
| 5,361,406 A | * | 11/1994 | Wignot | ..................... 455/200.1 |
| 5,418,577 A | | 5/1995 | Bagley | |
| 5,555,466 A | | 9/1996 | Scribner et al. | |
| 5,570,347 A | * | 10/1996 | Bestler | ......................... 370/17 |
| 5,628,056 A | | 5/1997 | Grysiewicz et al. | |
| 5,666,658 A | | 9/1997 | Borchardt et al. | |
| 5,701,589 A | * | 12/1997 | Lee | ............................ 455/56.1 |
| 5,771,441 A | * | 6/1998 | Altstatt | ......................... 455/66 |
| 5,812,937 A | * | 9/1998 | Takahisa | ........................ 455/66 |
| 5,867,223 A | * | 2/1999 | Schindler | ..................... 348/552 |
| 5,983,100 A | * | 11/1999 | Johansson | .................... 455/426 |

OTHER PUBLICATIONS

U.S. application No. 09/159,964, Ferguson.

* cited by examiner

Primary Examiner—Vivian Chang
Assistant Examiner—John J. Lee
(74) Attorney, Agent, or Firm—Brooks & Kushman P.C

(57) ABSTRACT

An in-vehicle audio/video system broadcasts audio programming within the vehicle at low power over a system audio channel that is received by a wireless radio frequency receiver that operates in a restricted range to increase tuning resolution and allow fine tuning of the system audio channel. The receiver includes a frequency range adjuster coupled to the tuner. The range adjuster is operable in first and second modes. The first mode selects the frequency range as a full range, and the second mode selects the frequency range as the restricted range.

25 Claims, 4 Drawing Sheets

IN-VEHICLE AUDIO/VIDEO SYSTEM

TECHNICAL FIELD

The present invention relates to in-vehicle audio/video systems.

BACKGROUND ART

In an existing in-vehicle audio/video system, a display device is mounted within the vehicle and signals are either received over-the-air or from a direct connection such as a video tape player or digital video disk (DVD) player. The video programming is sent to the display device, while the corresponding audio programming is sent to the vehicle radio over a coaxial cable. To listen to the audio programming, the vehicle occupant tunes the built-in vehicle radio to a predetermined station according to settings on the attached video player.

One problem with these existing systems is that the coaxial cable connecting the video player and display device to the built-in vehicle radio makes after market installation rather difficult. As such, with existing in-vehicle systems, it is preferred that the system is set up while the interior vehicle is being put together. Another existing system attempts to address this problem by eliminating the coaxial cable. This type of system broadcasts the audio signal at low power within the vehicle so that the built-in radio may be tuned to a predetermined channel and receive the system audio channel. However, because the radio spectrum is rather crowded, it is sometimes difficult to lock onto the system audio channel due to noise from other channels, particularly in the frequency modulation (FM) radio spectrum.

For the foregoing reasons, there is a need for in-vehicle audio/video system that facilitates after market installation.

DISCLOSURE OF INVENTION

It is, therefore, an object of the present invention to provide an in-vehicle audio/video system wherein audio programming is broadcast within the vehicle at low power over a system audio channel, in which a tuner and range adjuster are operable in first and second modes having a full bandwidth and a restricted bandwidth, respectively, to allow fine tuning by the tuner of the system audio channel.

In carrying out the above object, a wireless radio frequency receiver for an in-vehicle audio/video system is provided. Video programming is sent to a display device and corresponding audio programming is broadcast within the vehicle at low power over a system audio channel. The receiver comprises an antenna, a tuner, and a frequency range adjuster. The tuner is coupled to the antenna and has an output at a received channel. The tuner has an adjustable component that is adjusted to select the received channel from a selectable frequency range. The frequency range adjuster is coupled to the tuner, and is operable in first and second modes. The range adjuster is configured such that the first mode selects the frequency range for the tuner as a full range including local broadcast channels, with the full range having a first bandwidth. Further, the range adjuster is configured such that the second mode selects the frequency range as a restricted range including the system audio channel, with the restricted range having a second bandwidth that is significantly less than the first bandwidth to allow fine tuning by the tuner of the system audio channel.

Preferably, the audio programming is broadcast as a frequency modulated signal and the receiver further comprises a frequency demodulator coupled to the tuner output. Additionally, in a preferred construction, a down converter is located between the tuner output and the frequency demodulator.

Further, in a preferred embodiment, the tuner includes a voltage controlled capacitance. The frequency range adjuster is operative to select the frequency range by supplying a first voltage to the tuner when operating in the first mode, and by supplying a second voltage to the tuner when operating in the second mode. The voltage controlled capacitance may be, for example, a tuning diode with the adjustable component of the tuner selecting the received channel by applying a portion of the supplied voltage to the tuning diode. An audio amplifier is coupled to the demodulator, and speakers are coupled to the audio amplifier.

Further, in carrying out the present invention, a headset for an in-vehicle audio/video system is provided. Video programming is sent to a display device and corresponding audio programming is broadcast within the vehicle at low power over a system audio channel. The headset comprises a main body and a wireless radio frequency receiver attached to the main body. The receiver includes a tuner coupled to an antenna, and a frequency range adjuster coupled to the tuner. The range adjuster is operable in first and second modes. The range adjuster is configured such that the first mode selects the frequency range as a fall range with a first bandwidth, and such that the second mode selects the frequency range as a restricted range including the system audio channel and having a second bandwidth. The second bandwidth is significantly less than the first bandwidth to allow fine tuning of by the tuner of the system audio channel.

Still further, in carrying out the present invention, an in-vehicle audio/video system wherein audio programming is broadcast within the vehicle at low power over a system audio channel is provided. The system comprises a display device for receiving video programming, and a wireless radio frequency receiver. The receiver includes a tuner coupled to an antenna and having an output at a received channel. The tuner has an adjustable component that is adjusted to select the received channel from a selectable frequency range. The receiver further includes a frequency range adjuster coupled to the tuner, and the range adjuster is operable in first and second modes. Operating the range adjuster in the first mode selects the frequency range as a full range including local broadcast channels and having a first bandwidth. Operating the range adjuster in the second mode selects the frequency range as a restricted range including the system audio channel and having a second bandwidth. The second bandwidth is significantly less than the first bandwidth to allow fine tuning by the tuner of the system audio channel.

In one embodiment, the system further comprises an audio/video source operative to provide the video programming to the display device and to broadcast the audio programming within the vehicle at low power over the system audio channel. The audio/video source may be in a variety of different forms such as, for example, a video player or a video game system. Further, the audio/video source may be a main antenna coupled to the display device and operative to receive over-the-air audio and video programming, and a converter coupled to the main antenna. The converter converts the audio programming to allow broadcasting of the audio programming within the vehicle at low power over the system audio channel.

Even further, in carrying out the present invention, an in-vehicle audio/video system wherein audio programming is broadcast within the vehicle at low power over a system audio channel is provided. The system comprises a display device, and a wireless radio frequency receiver. The receiver includes a frequency range adjuster coupled to the tuner and operable in first and second modes. In the first mode, the range adjuster selects the frequency range as about 88 megahertz to about 108 megahertz. In the second mode, the range adjuster selects the frequency range as a restricted range that preferably is about 88 megahertz to about 92 megahertz to allow fine tuning by the tuner of the system audio channel, with the system audio channel being within the restricted bandwidth of the second operating mode.

In one embodiment, the range adjuster includes a switch having a first position that causes the range adjuster to operate in the first mode, and a second position that causes the range adjuster to operate in the second mode, The advantages associated with embodiments of the present invention are numerous. For example, embodiments of the present invention facilitate after market installation of an in-vehicle audio/video system. Still further, embodiments of the present invention allow a headset to be switched between a normal full range mode, and a special restricted range mode for receiving the system audio channel. By restricting the overall bandwidth, while using the same physical or mechanical range for the tuner, the restricted bandwidth allows finer tuning. As such, in preferred embodiments, the audio/video source is configured to allow a user to select the system audio channel from a plurality of channels between about 88 megahertz and about 92 megahertz. In turn, a switch on a user headset allows the user to switch between the normal frequency modulation (FM) bandwidth, and a restricted bandwidth, preferably a subset of the full bandwidth, to allow fine tuning of the system audio channel.

In some embodiments of the present invention, it may be desirable to use the built-in vehicle receiver to receive the system audio channel, in addition to using any wireless receivers. If it is expected that the built-in receiver will be used in such a way, some embodiments of the present invention optionally provide a transmission line having a first end connected to built-in receiver. The second end of the transmission line should be located within the vehicle, and defines an antenna for receiving the low power broadcast. Effectively, this gives the built-in receiver two antennas. The first antenna is the traditional, outside of the vehicle, antenna, while the second antenna is defined at the end of the transmission line. This is advantageous in that because the system audio channel is broadcast at low power, it may (in some instances) be easier to receive with an antenna that is within the vehicle. In one suitable implementation, a Y connection in a wiring box at the back of the built-in receiver allows one branch to go to the outdoor antenna, and allows the other branch to end at an antenna near the low power audio signal source within the vehicle. Of course, it is appreciated that appropriate steps may need to be taken to reduce impedance problems on the transmission line. For example, a 4.7 pF capacitor may be placed along the inside antenna drop.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
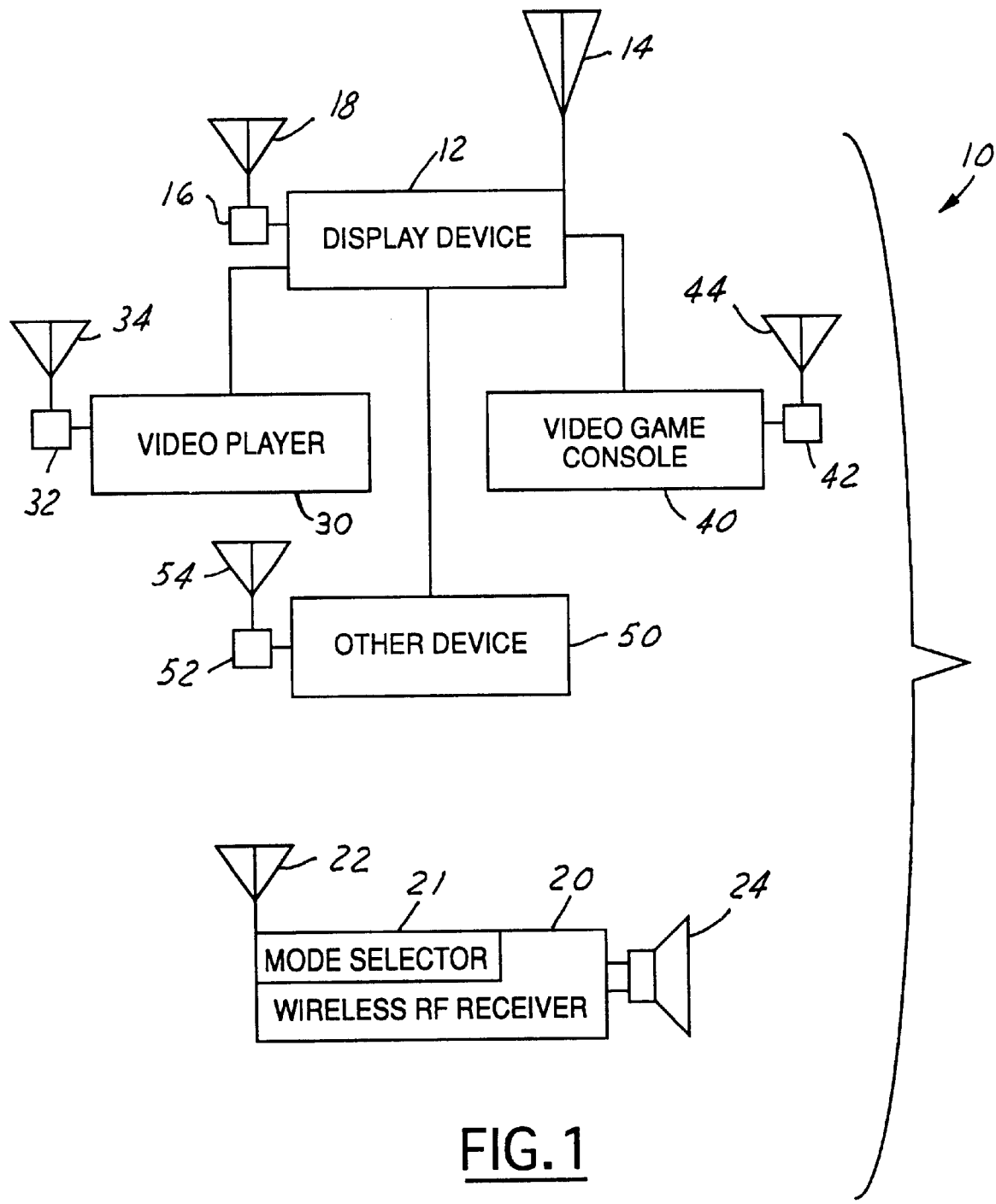
FIG. 1 is a block diagram illustrating an in-vehicle audio/video system of the present invention.

With reference to FIG. 1, an in-vehicle audio/video system of the present invention is generally indicated at 10. System 10 includes a display device 12 which may take many known forms such as, for example, a cathode rate tube (CRT) or a liquid crystal display (LCD). Display device 12 receives video programming from a programming source. Display device 12 may receive programming in a variety of ways, with one such way being over-the-air transmissions received at an antenna 14.

When the audio and video over-the-air signals are received at antenna 14, the video signal is displayed on display device 12, and the audio signal is sent to converter 16. Converter 16 converts the audio programming to a radio frequency signal that is broadcast from antenna 18. A wireless radio frequency receiver 20 has an antenna 22 and a tuner. The tuner is used to tune to the system audio channel at which the audio programming is broadcast at low power within the vehicle from antenna 18. Audio signals corresponding to the video on display device 12 are sent to speaker 24. Of course, receiver 20 may be configured for mono or stereo playback.

Advantageously, receiver 20 has first and second modes of operation. A mode selector 21, preferably implemented as a switch, allows the user to select a bandwidth for the tuner. The first mode allows normal full range tuning, such as tuning over the frequency modulation (FM) spectrum range from about 88 megahertz to about 108 megahertz. The second mode allows tuning of a restricted bandwidth. For example, the second mode in a preferred embodiment allows tuning over a restricted bandwidth from about 88 megahertz to about 92 megahertz. By restricting the frequency range of the tuner while keeping the same mechanical range for the tuning dial (or equivalent moveable channel selector), tuner resolution is increased. As such, when a user desires to listen to the audio programming corresponding to the video on display device 12, the second mode of operation for receiver 20 increases the resolution of the tuner to allow fine tuning of the system audio channel. An advantage of the increased resolution is that receiver 20 may accurately tune into the low power transmissions from antenna 18, even though high power commercial channels are broadcast at nearby frequencies.

Of course, it is to be appreciated that display device 12 is not limited to over-the-air programming. For example, a video player 30 may provide video signals to display device 12. The audio portion of programming from video player 30 is routed to converter 32, and subsequently transmitted by antenna 34. Antenna 22 and receiver 20 receive the audio programming corresponding to the video being displayed on device 12. Of course, it is appreciated that audio/video devices attached to display device 12 need not have their own converters. For example, video player 30 may send both audio and video signals to display device 12, with the audio signal subsequently being sent to converter 16. Video player 30 may be any type of video player such as any of the various available video tape recorder models, or a digital video disk (DVD) player.

Still further, in the alternative, a video game console 40 may be connected to display device 12. Similar to video player 30, video game console 40 sends video programming to display device 12, while sending audio programming to converter 42. The converted audio signal is broadcast at a predetermined radio frequency by antenna 44 for reception by antenna 22 of receiver 20. Of course, similar to video player 30, video game console 40 need not have its own converter 42 but may in the alternative send both audio and video signals to display device 12, with the audio signal being converted and then transmitted from antenna 18. It is to be appreciated that although a video player and a video game console have been named as examples, other devices may connect to display device 12 in a similar fashion to implement embodiments of the present invention. For example, generic device 50 connects to display device 12, and connects to a converter 52 connected to an audio signal transmitting antenna 54. Similarly, both audio and video signals from device 50 could be sent to display device 12, with the audio signal being transmitted from antenna 18.

In accordance with the present invention, various sorts of video programming may be displayed on display device 12 with the corresponding audio programming being converted, transmitted, and received at antenna 22 of receiver 20. Advantageously, mode selector 21 allows the user to restrict the bandwidth of receiver 20 thereby increasing tuner resolution to allow fine tuning of the system audio channel. This fine tuning is advantageous in that noise from high power commercial stations may be tuned out. In a preferred embodiment, receiver 20 is implemented as a headset. One mode of operation is a normal operation mode, such as a frequency modulation (FM) spectrum radio. The other mode of operation is a restricted bandwidth mode, wherein only a small portion such as the lower end of the spectrum may be received to allow fine tuning of the audio programming.

With reference to FIGS. 2–6, a headset of the present invention is generally indicated at 60. Headset 60 includes a main body 62. Arms 64 and 66 are telescopically received within main body 62 to allow adjustment of headset 60 for different people. Left and right speakers 68 and 70, respectively, are preferably at least partially covered with a padding material. Further, main body piece 62 may also be covered with a padding material for comfort.

Figure 2:
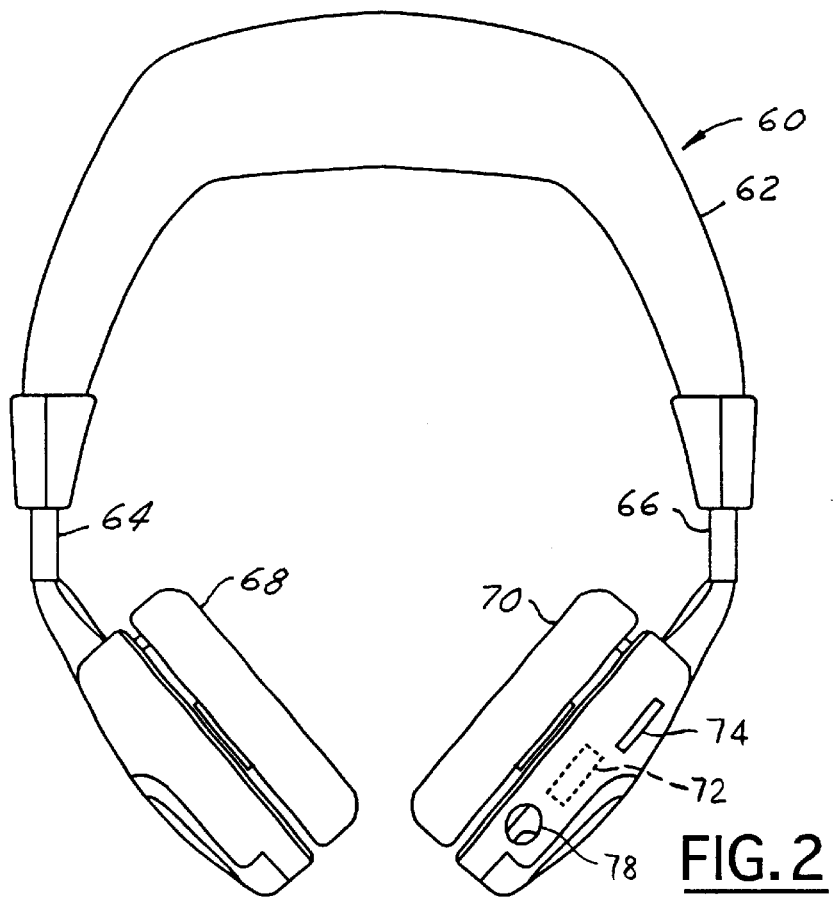
FIG. 2 is a headset made in accordance with the present invention, and utilizing a wireless RF receiver with first and second modes of operation.
Figure 3:
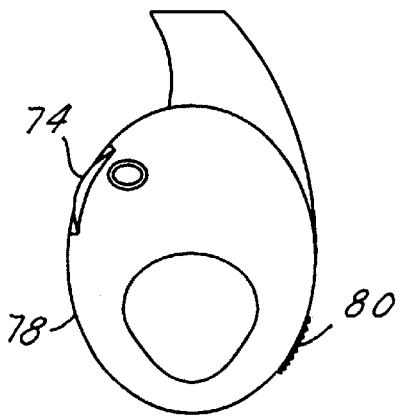
FIG. 3 is a side view of the headset shown in FIG. 2.
Figure 5:
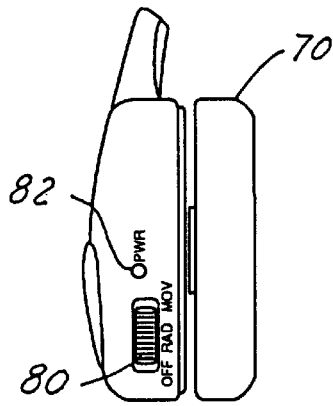
FIG. 5 is the front side of the side portion of the headset, showing the mode selection switch with three positions: off, radio (first mode), and movie (second mode)
Figure 4:
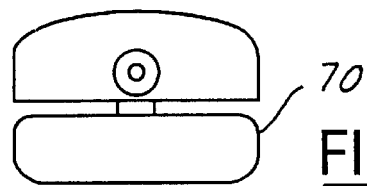
FIG. 4 is a bottom view of the headset side portion shown in FIG. 3.
Figure 6:
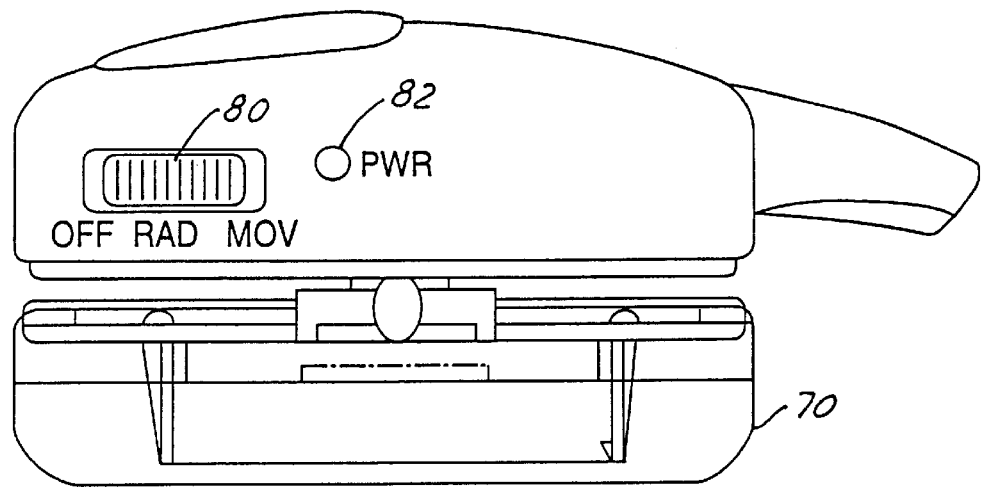
FIG. 6 is an enlarged view of the headset portion shown in FIG. 5.

As shown in FIG. 2, headset 60 includes an internal receiver 72, and has a tuning dial 74. Further, headset 60 includes a volume control dial 78 and a mode switch 80. As best shown in FIG. 6, mode switch 80 has three positions: off, normal radio mode, and movie mode. When switch 80 is in the off position, receiver 72 is off. When switch 80 is moved into the radio mode position, power light emitting dial (LED) 82 becomes illuminated. In the radio mode of the preferred embodiment, the tuner has a frequency range from about 88 megahertz to about 108 megahertz. When switch 80 is moved to the movie mode, in the preferred embodiment, the tuner has a frequency range from about 88 megahertz to about 92 megahertz.

Advantageously, tuning dial 74 has the same mechanical tuning range, however, the corresponding frequency range is much smaller in the movie mode than in the radio mode. As such, in the movie mode, the user can fine tune to the system audio channel. Of course, it is appreciated that although the preferred embodiment, of the present invention has a full range mode that receives the full band of frequency modulation (FM) radio, the full range bandwidth may be different depending on the application. Further, although frequency modulation is suitable for embodiments of the present invention, the present invention is independent of any particular modulation technique. Further, in the preferred embodiment, the restricted range mode, referred to as the movie band, is from about 88 megahertz to about 92 megahertz. Of course, it is appreciated that the bandwidth of the restricted range may be larger or smaller than the preferred embodiment, depending on the particular resolution required for the application. Further, although the second position for the switch has been referred to as movie mode, it is appreciated that the restricted bandwidth mode may be used for various applications including for receiving audio corresponding to a video player, over-air transmissions, or video game systems.

Figure 7:
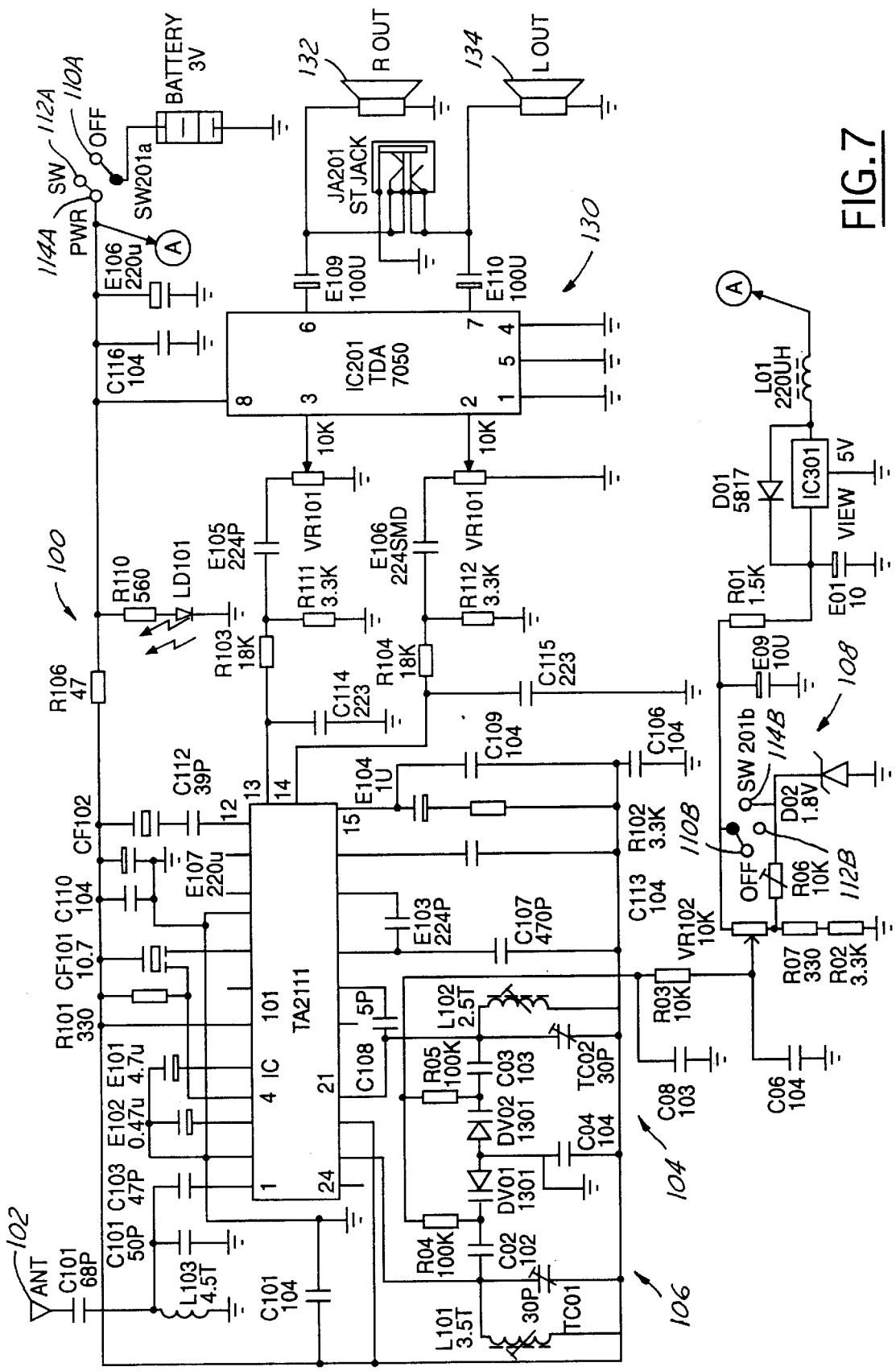
FIG. 7 is a circuit diagram of a tuning circuit and frequency range adjust circuit in a preferred embodiment of the present invention.

With reference now to FIG. 7, the receiver used in the preferred embodiment of the present invention is generally indicated at 100. Although there are many ways to implement a radio frequency receiver, the embodiment illustrated utilizes a front end radio receiver integrated circuit. In a suitable implementation, the front end chip is the TA2111. Of course, other front end chips may also be suitable, and discrete components may be used in the alternative. It is to be appreciated that receiver front end chips are known in the art, and selection of a front end chip is a design choice. Although the TA2111 is capable of receiving both AM and FM stations, the embodiment illustrated applies only to frequency modulated signals. Pin 1 of the front end chip is the radio frequency input from antenna 102. The front end chip includes the radio frequency amplifier stage. Pin 23 is the amplified radio frequency signal that has to be tuned for best amplification.

Pin 21 of the front end chip is the local oscillator of the radio receiver. In the embodiment illustrated, the local oscillator is tuned to oscillate at a frequency 10.7 megahertz higher than the received radio station. The mixer stage accordingly produces a 10.7 megahertz frequency signal that is later amplified. The local oscillator is formed by four resonate elements (L102, TC02, C03, and DV02). The mixer output is at pin 4 of the front end chip, and is fed through a 10.7 megahertz ceramic filter. As such, unwanted signal frequencies are filtered out and only the 10.7 megahertz signal is passed through the following stages for amplification and frequency demodulation. Of course, although a superheterodyne receiver is illustrated, other receiver types may be suitable depending on the frequencies and modulation types of the received signals.

The tuner, as shown is implemented as a tuning circuit at pin 23 of the front end chip and consists of four resonate elements (L101, TC02, C02, and DV01). The voltage to control the tuning frequency is produced by frequency range adjuster 108, which supplies voltage to tuner 106 and local oscillator 104. In particular, as shown, the frequency range adjuster is implemented as a circuit consisting of R04, C08, R03, C06, VR1022, R07, R02, R06, D02, and SW201. Further, R05 connects the range adjuster to the local oscillator. Of course, it is appreciated by those skilled in the art that although a particular tuner circuit and range adjuster circuit are illustrated in FIG. 7, it is understood that this is a preferred implementation and that there are various ways to construct a circuit in accordance with the present invention that forms the requisite tuner and range adjuster in a different manner than that specifically illustrated in FIG. 7. Further, it is to be appreciated that a voltage controlled capacitance is used in the preferred tuner, but other tuning techniques may be utilized in the alternative.

To actively control the tuning frequency of tuner 106, the value of capacitor C02 is selected to be very large so that it will not affect the tuning frequency. C02 serves as a direct current (DC) blocking element so that the tuning DC voltage will not be connected to front end integrated circuit TA2111 and L101. The resultant tuning capacitance is the sum of capacitor TC01 and the capacitance of tuning diode DV01. That is, DV01 is a voltage control capacitance. Of course, it is appreciated by those skilled in the art that there may be other forms of implementing a voltage controlled capacitance. In the embodiment illustrated, the actual resonate frequency is approximated by the following formula:

$$\text{Frequency} = \frac{1}{2\pi\sqrt{LC}}$$

Capacitance of the voltage tuning diode DV01 is inversely proportional to the DC voltage applied across its two terminals. Therefore, the resonating frequency of the tuning circuit is subject to the DC voltage applied to the junction of C02 and tuning diode DV01. In a similar manner, local oscillator 104 has tuning diode DV02 that operates such that the local oscillator stays tuned at a frequency 10.7 megahertz higher than the received radio station as mentioned previously. Frequency range adjuster 108, in the preferred embodiment, controls the tuner 106 by varying the supply voltage available at the tuning diode. That is, tuner 106 is operative over the full range from about 88 megahertz to about 108 megahertz as the voltage varies from about 0.5 volts to about 5 volts. On the other hand, a voltage that varies from about 0.7 volts to about 1.5 volts only gives tuner 106 a range from about 88 megahertz to about 92 megahertz. In a suitable construction, this limited tuning range is approximately from about 88.3 megahertz to about 90.9 megahertz. The lower end of the FM spectrum is preferred because less interference from commercial stations is expected.

Of course, it is appreciated that the smaller the voltage range, the greater the resolution for tuning. Of course, it is appreciated that this range to resolution relationship may also vary based on other factors such as the linearity of changes in voltage with respect to movement of the mechanical tuner, which is usually a rotatable knob. In the embodiment illustrated in FIG. 7, the mechanical tuner moves the wiper of the potentiometer VR102. Thus, circuit 108 is used to change the voltage across VR102 to change the range of voltage applied to tuner 106 as the tuning knob is turned. The applied voltage affects the tuning capacitance.

As shown in FIG. 7, the preferred embodiment of the invention switches between the different modes with a mechanical switch. In FIG. 7, the mechanical switch moves both switch SW201*a* and SW201*b*. As such, each position of switch SW201*b* has a corresponding position for switch SW201*a*, namely, off positions 110A and 110B, radio mode positions 112A and 112B, and movie mode or restricted range mode positions 114A and 114B.

When the switch is off, a regulated DC voltage is applied to the junction of SW201 and VR102 from voltage supply circuit 120. In the off position, the voltage at the junction of VR102 and R07 is controlled by the resistance ratio of VR102, R07, R02, R06, and the voltage supplied from zener diode D02. C06, R03, and C08 serve as noise filtering elements so that the controlling DC voltage is stable. R04 is selected so that it provides suitable insulation between the tuning circuit and the tuning voltage supply circuit. The tuning voltage supplied to the tuning element is adjusted by potentiometer VR102 and can go as high as 5 volts when switch SW201 is turned on in the radio mode at position 112A and 112B. With the tuning voltage allowed to vary over the full range up to 5 volts, the circuit is able to resonate as high as about 108 megahertz which is suitable for normal FM radio reception.

When switch SW201 is placed in the movie band or restricted bandwidth position 114A and 114B, the voltage supplied at VR102 is reduced to about 1.8 volts by zener diode D02. As such, maximum available tuning voltage is only 1.8 volts. Therefore, the highest between frequency of resonate circuit 106 is limited to a lower frequency of about 92 megahertz. As such, the tuning range of the radio receiver is confined while the mechanical range of the tuning dial remains the same. As such, the user is able to fine tune to the system audio channel.

With continuing reference to FIG. 7, after downconverting, filtering, and demodulation, the front end chip TA2111 has right and left outputs at pins 13 and 14, respectively. A stereo audio amplifier circuit connects the outputs to right and left speakers 132 and 134, respectively. One suitable stereo audio amplifier is the TDA7050 generally indicated at 130. It is appreciated that audio amplifier integrated circuits are known in the art, and selection of an amplifier chip is a design choice.

It is appreciated that the circuit shown in FIG. 7 is one implementation of the present invention, and that many constructions for the tuner and range adjuster are possible with the present invention. Further, in preferred embodiments, the restricted bandwidth includes several different system audio channels. As such, the display device or audio/video source device has a switch that selects the transmitting frequency for the audio programming. This is advantageous in that some stations in the restricted band may be difficult to time because of noise from nearby commercial radio stations. By providing multiple channels within the restricted band, the user is allowed several different selections for system audio frequency.

It is to be appreciated that embodiments of the present invention provide an in-vehicle audio/video system where an audio program is broadcast within the vehicle at low power over a system audio channel. Advantageously, the system may be installed as an after-market system, without the hassle of wiring the audio to the built-in radio, and with the added advantage of wireless headsets. As such, headset wearers may watch the display device while listening to the corresponding sound, while other vehicle occupants may listen to the built-in radio. In one application, the display device may be a 6.4 inch TFT/active matrix flip-down screen with an on-screen display for channel select, input select, and videotape recording from its controls. Still further, the display device may have a built-in wireless transmitter with user-selectable 3-channel transmitter operation, and mono/stereo source selection functionality as well.

Although the circuit of FIG. 7 and the use of the TA2111 and TDA7050 is an exemplary implementation of the present invention, many variations are contemplated. For example, the tuner may be any type of tuning circuit. The adjustable component of the tuning circuit may be any component configured to vary the tuner resonate frequency.

For example, a variable inductance or a variable capacitance may serve as the frequency selector. Further, the inductance or capacitance may be adjusted directly, or may be adjusted indirectly as a voltage or current dependent element. In FIG. 7, the tuning diode is a voltage dependent element. In turn, the range adjuster may take any form appropriate for the frequency selecting component. In FIG. 7, the available voltage range for a voltage dependent element is adjusted with a suitable circuit. Similarly, available current range may be adjusted for a current dependent element. Further, switching modes may change capacitance or inductance of the tuning circuit all together. That is, the restricted bandwidth is not required to be a subset of the full bandwidth.

Figure 8:
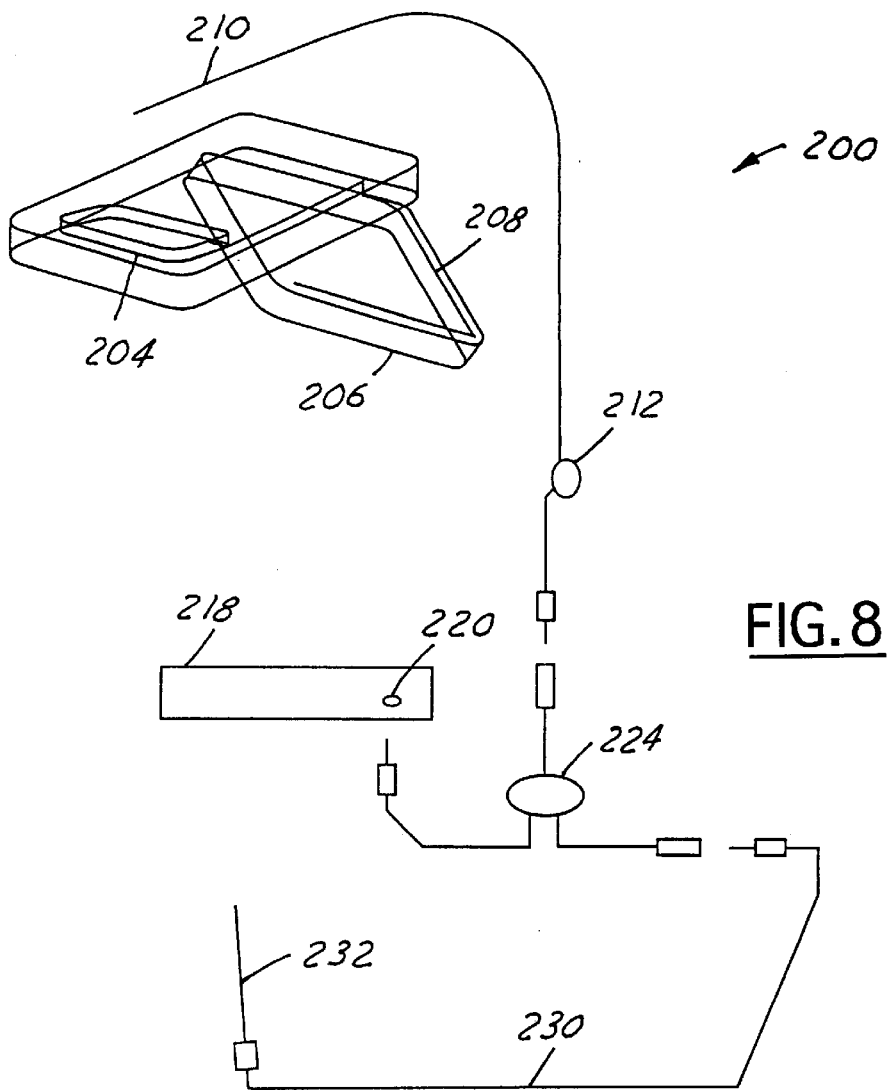
FIG. 8 is an alternative embodiment of the invention that utilizes an in-vehicle antenna connected to the built-in receiver.

With reference to FIG. 8, an alternative embodiment of the present invention is generally indicated at 200. An audio/video source within the vehicle provides video programming to the display device, and broadcasts the audio programming within the vehicle at low power over the system audio channel with a suitable transmitter, such as transmitter 204. As shown, the display is a liquid crystal display (LCD) 206, and the audio broadcasting antenna 208 extends along the side of the screen. Of course, any suitable arrangement may be used to provide a display and a transmitting antenna. Because transmissions from antenna 208 are at low power, it may sometimes be difficult to receive the system audio channel through the outdoor antenna of the vehicle. That is, although the wireless receivers may readily receive the system audio channel, sometimes it may be desirable to receive the system audio through the built-in receiver of the vehicle. To improve reception at the built-in receiver (particularly helpful in the presence of strong local broadcast signals), antenna 210 is defined at an end of a transmission line that connects to the antenna input 220 at the back of the built-in receiver 218. The standard antenna 232 is connected to the built-in vehicle receiver by transmission line 230. A wiring box 224 provides a Y connection to allow both the outdoor antenna 232 and the indoor antenna 210 to reach built-in receiver input 220.

When the system audio channel is being broadcasted, antenna 208 is sufficiently spaced from the vehicle roof to avoid undesirable interference. In the preferred embodiment, in order to ensure that the radiated signal from antenna 208 is fed into the in-car radio receiver 218, a coaxial cable, with a six inch section of the center core exposed defines antenna 210. The exposed length acts as a pick-up antenna and picks up the signal radiated from antenna 208. A 4.7 pF capacitor 212 is a suitable element for controlling the amount of signal flow to the radio input as well as for offering a high impedance loading into the original circuit from antenna 232.

While the best mode for carrying out the invention has been described in detail, those familiar with the art to which this invention relates will recognize various alternative designs and embodiments for practicing the invention as defined by the following claims.

What is claimed is:

1. A wireless radio frequency receiver for an in-vehicle audio/video system in which video programming is sent to a display device and corresponding audio programming is broadcast within the vehicle at low power over a system audio channel, the receiver comprising:

an antenna;

a tuner coupled to the antenna and having an output at a received channel, the tuner having an adjustable component that is adjusted to select the received channel from a selectable frequency range; and a frequency range adjuster coupled to the tuner, the range adjuster being operable in first and second modes, and being configured such that the first mode selects the frequency range as a full range including local broadcast channels and having a first bandwidth, and such that the second mode selects the frequency range as a restricted range including the system audio channel and having a second bandwidth that is significantly less than the first bandwidth to allow fine tuning by the tuner of the system audio channel.

2. The receiver of claim 1 wherein the audio programming is broadcast as a frequency modulated signal, and wherein the receiver further comprises:

a frequency demodulator coupled to the tuner output.

3. The receiver of claim 2 further comprising:

a downconverter between the tuner output and the frequency demodulator.

4. The receiver of claim 1 wherein the tuner includes a voltage controlled capacitance, and wherein the frequency range adjuster is operative to select the frequency range by supplying a first voltage to the tuner when operating in the first mode and by supplying a second voltage to the tuner when operating in the second mode.

5. The receiver of claim 4 wherein the voltage controlled capacitance is a tuning diode, and wherein the adjustable component selects the received channel by applying a portion of the supplied voltage to the tuning diode.

6. The receiver of claim 1 further comprising:

a demodulator coupled to the tuner output; and an audio amplifier coupled to the demodulator.

7. A headset for an in-vehicle audio/video system in which video programming is sent to a display device and corresponding audio programming is broadcast within the vehicle at low power over a system audio channel, the headset comprising:

a main body; and a wireless radio frequency receiver attached to the main body, the receiver including an antenna, a tuner coupled to the antenna and having an output at a received channel, the tuner having an adjustable component that is adjusted to select the received channel from a selectable frequency range, and the receiver further including a frequency range adjuster coupled to the tuner, the range adjuster being operable in first and second modes, and being configured such that the first mode selects the frequency range as a full range including local broadcast channels and having a first bandwidth, and such that the second mode selects the frequency range as a restricted range including the system audio channel and having a second bandwidth that is significantly less than the first bandwidth to allow fine tuning by the tuner of the system audio channel.

8. The headset of claim 1 wherein the audio programming is broadcast as a frequency modulated signal, and wherein the receiver further comprises:

a frequency demodulator coupled to the tuner output.

9. The headset of claim 8 wherein the receiver further comprises:

a downconverter between the tuner output and the frequency demodulator.

10. The headset of claim 7 wherein the tuner includes a voltage controlled capacitance, and wherein the frequency range adjuster is operative to select the frequency range by supplying a first voltage to the tuner when operating in the first mode and by supplying a second voltage to the tuner when operating in the second mode.

11. The headset of claim 10 wherein the voltage controlled capacitance is a tuning diode, and wherein the adjustable component selects the received channel by applying a portion of the supplied voltage to the tuning diode.

12. The headset of claim 7 wherein the receiver further comprises:
 a demodulator coupled to the tuner output; and
 an audio amplifier coupled to the demodulator.

13. An in-vehicle audio/video system wherein audio programming is broadcast within the vehicle at low power over a system audio channel, the system comprising:
 a display device for receiving video programming;
 a wireless radio frequency receiver, the receiver including an antenna, a tuner coupled to the antenna and having an output at a received channel, the tuner having an adjustable component that is adjusted to select the received channel from a selectable frequency range, and
 the receiver further including a frequency range adjuster coupled to the tuner, the range adjuster being operable in first and second modes, and being configured such that the first mode selects the frequency range as a full range including local broadcast channels and having a first bandwidth, and such that the second mode selects the frequency range as a restricted range including the system audio channel and having a second bandwidth that is significantly less than the first bandwidth to allow fine tuning by the tuner of the system audio channel.

14. The system of claim 13 further comprising:
 an audio/video source operative to provide the video programming to the display device and to broadcast the audio programming within the vehicle at low power over the system audio channel.

15. The system of claim 14 wherein the audio/video source further comprises:
 a main antenna coupled to the display device and operative to receive over-the-air audio and video programming; and
 a converter coupled to the main antenna for converting the audio programming to allow broadcasting the audio programming within the vehicle at low power over the system audio channel.

16. The system of claim 14 wherein the audio/video source is a video player.

17. The system of claim 13 wherein the tuner includes a voltage controlled capacitance, and wherein the frequency range adjuster is operative to select the frequency range by supplying a first voltage to the tuner when operating in the first mode and by supplying a second voltage to the tuner when operating in the second mode.

18. An in-vehicle audio/video system wherein audio programming is broadcast within the vehicle at low power over a system audio channel, the system comprising:
 a display device for receiving video programming;
 a wireless radio frequency receiver, the receiver including an antenna, a tuner coupled to the antenna and having an output at a received channel, the tuner having an adjustable component that is adjusted to select the received channel from a selectable frequency range of frequency modulated channels, and
 the receiver further including a frequency range adjuster coupled to the tuner, the range adjuster being operable in first and second modes, and being configured such that the first mode selects the frequency range as about 88 megahertz to about 108 megahertz to define a first mode bandwidth, and such that the second mode selects the frequency range as a restricted range including the system audio channel and having a restricted bandwidth that is less than the first mode bandwidth to allow fine tuning of the system audio channel.

19. The system of claim 18 wherein the frequency range adjuster includes a switch having a first position that causes the range adjuster to operate in the first mode, and a second position that causes the range adjuster to operate in the second mode.

20. The system of claim 18 further comprising:
 an audio/video source operative to provide the video programming to the display device and to broadcast the audio programming within the vehicle at low power over the system audio channel, wherein the audio/video source is configured to allow a user to select the system audio channel from a plurality of channels within the restricted bandwidth.

21. The system of claim 18 wherein the restricted bandwidth is a subset of the first mode bandwidth.

22. The system of claim 21 wherein the restricted bandwidth ranges from about 88 megahertz to about 92 megahertz.

23. The system of claim 18 wherein the tuner includes a voltage controlled capacitance, and wherein the frequency range adjuster is operative to select the frequency range by supplying a first voltage to the tuner when operating in the first mode and by supplying a second voltage to the tuner when operating in the second mode.

24. An in-vehicle system wherein audio programming is broadcast within the vehicle at low power over a system audio channel, the vehicle including a built-in receiver, the system comprising:
 a display device for receiving video programming;
 a wireless radio frequency receiver, the receiver including an antenna, a tuner coupled to the antenna and having an output at a received channel, the tuner having an adjustable component that is adjusted to select the received channel from a selectable frequency range, and
 the receiver further including a frequency range adjuster coupled to the tuner, the range adjuster being operable in first and second modes, and being configured such that the first mode selects the frequency range as a full range including local broadcast channels and having a first bandwidth, and such that the second mode selects the frequency range as a restricted range including the system audio channel and having a second bandwidth that is significantly less than the first bandwidth to allow fine tuning by the tuner of the system audio channel; and
 a transmission line having a first end connected to the built-in receiver, the transmission line having a second end located within the vehicle and defining an antenna for receiving the low power broadcast.

25. The system of claim 24 further comprising:
 an audio/video source operative to provide the video programming to the display device and to broadcast the audio programming within the vehicle at low power over the system audio channel, wherein the transmission line second end is located approximate the audio/video source.

* * * * *